Feb. 26, 1935.  S. KARASAWA  1,992,826

SYNCHRONOUS MOTOR

Filed Sept. 5, 1934

Inventor:
Shizuo Karasawa,
by Harry E. Dunham
His Attorney.

Patented Feb. 26, 1935

1,992,826

UNITED STATES PATENT OFFICE 1,992,826

SYNCHRONOUS MOTOR

Shizuo Karasawa, Tokyo, Japan, assignor to General Electric Company, a corporation of New York Application September 5, 1934, Serial No. 742,744
In Japan November 30, 1933

7 Claims. (Cl. 172—275)

My invention relates to synchronous motors and in particular to the starting operation thereof, and it is a primary object of my invention to provide a simple synchronous motor and automatic circuit control apparatus therefor that will enable the motor to accelerate from standstill to synchronous speed with a high torque and be self-synchronizing.

In carrying my invention into effect I provide a motor having simple salient pole rotor and stator elements without the conventional form of starting means. One of these elements is polarized with a unidirectional flux and the other element has a simple exciting winding thereon which is energized through a variable frequency rectifying apparatus in such a way that for all speeds below synchronism the motor is in effect excited with an alternating current which varies in frequency from zero to line frequency as the motor accelerates from zero to synchronous speed and produces a polarity in the excited poles which changes with the relative position of stator and rotor salient poles in a manner to produce a unidirection accelerating torque.

The features of my invention which are believed to be novel and patentable will be pointed out in the claims appended hereto. For a better understanding of my invention reference is made in the following description to the accompanying drawing showing in Fig. 1 a motor device of my invention where the rotor carries the alternating current exciting winding, and Fig. 2 represents the motor of my invention with this exciting winding on the stator and having a permanent magnet rotor.

Figure 1:
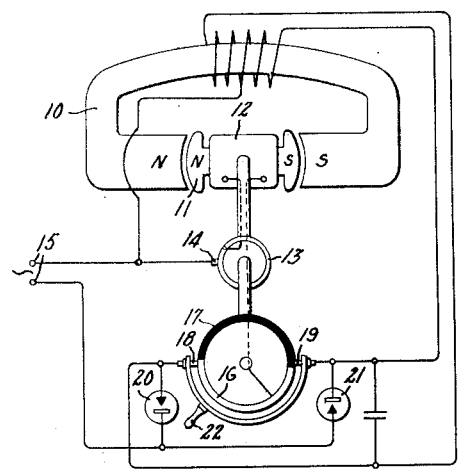
Figure 2:
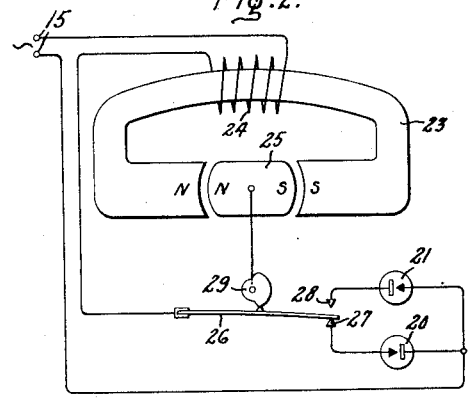

Referring now to Fig. 1, the stator 10 of the motor here consists of a simple bipolar magnet which may be a permanent magnet or direct current electromagnet. Between the pole pieces of the stator which are designated N and S to represent their polarities is a bar shaped rotor 11 having an energizing winding 12. One end of the energizing winding is brought out to a slip ring 13 on which slides a brush 14 connected to one side of a constant frequency alternating current source represented by alternating current terminals 15. The other end of winding 12 is brought out to a commutator ring having conducting and insulating segments 16 and 17 each extending over 180 degrees. Brushes 18 and 19 bear on this commutator ring at diametrically opposite points and these brushes are connected to the other side of the alternating current source through rectifiers or valves 20 and 21 arranged to allow current to pass in opposite directions in the two parallel brush paths through 18 and 19 respectively as indicated by the arrow marks by which the rectifiers are designated.

In the position of the parts represented in Fig. 1 it will be noted that brush 18 bears on the conducting portion 16 and brush 19 bears on the non-conducting portion 17 of the commutator. Consequently current can flow through exciting winding 12 only through brush 18 and owing to the presence of the valve 20 it can flow only in one direction. As a result only rectified current impulses of one direction can flow in the exciting winding under this condition. If these direct current impulses are such as to magnetize the rotor with N and S poles opposite the adjacent stator poles of like polarity as indicated, there will be a repulsion between the adjacent stator and rotor poles of like polarity and attraction between the unlike stator and rotor poles which are shown approximately 180 degrees from each other. The rotor will consequently tend to rotate through 180 degrees. If the rotation is clockwise, brush 18 will continue to bear on conducting segment 16 and brush 19 on the non-conducting segment 17 for approximately the 180 degrees rotation and the turning torque on the rotor will be continuous. If the rotor tends to start in a counter clockwise direction the circuit through brush 18 is interrupted and that through brush 19 is completed. Now the direct current pulsations through the exciting winding 12 will be reversed due to the presence of valve 21 and the polarity of the core 11 will reverse so that the torque in a counter clockwise direction of the rotor is interrupted almost immediately and is replaced by a reverse torque tending to align the poles as represented. The rotor can therefore rotate continuously only in a clockwise direction with the arrangement represented and if a false start is made it immediately reverses and starts in the clockwise direction. After rotating substantially 180 degrees from the position shown, brush 18 will bear on the non-conducting portion 17 and brush 19 on the conducting portion 16. The polarity of the rotor will reverse and it will have a continuous torque in a clockwise direction through the next 180 degrees. The rotor will therefore accelerate with a very high torque until synchronous speed is reached during which time direct current pulsations are supplied to the rotor due to the valves 20 and 21, but these pulsations are reversed as the rotor rotates through alternate 180 degrees due to the commutator. At synchronous speed the commutator will of course perform the same function as the rectifier valves and at this time we could if we so desired short-circuit the rectifiers and commutator. However, this is unnecessary as alternating current of line frequency flows in the exciting winding 12 at synchronous speed, one-half cycle passing through brush 18 and rectifier 20 and the alternate half cycle passing through brush 19 and rectifier 21. It may be stated that the commutator is a rectifying device which operates in synchronism with the rotor and thus at a variable frequency during acceleration while the rectifying valves 20 and 21 are static rectifying devices operating synchronously with the fixed frequency of the alternating current supply. At synchronous speed the frequency of rectification of the commutator becomes equal to the line frequency and consequently to that of the rectifying valves and although rectified current flows in the branch rectifying circuits the sum is a true alternating current which flows from the source 15 to the exciting winding 12 without distortion if the brushes are properly positioned. In this way I excite the rotor with current which in its effect may be considered to be an alternating current of zero frequency at standstill and which increases in frequency to that of the line at synchronous speed, the increase in frequency of the excitation being in exact proportion to the increase in speed and of such a phase relation as to produce a continuous accelerating torque between the stator and rotor.

To reverse the direction of rotation the brushes 18 and 19 will be shifted 180 degrees by the brush adjusting device represented at 22. This adjusting device will also be helpful in locating the brushes in the best position for smooth starting and maximum pull out torque at synchronous speed.

In the illustration a two-pole motor has been shown. For a greater motor pole number it will be evident that the segments of the commutator will be correspondingly increased in number but always spaced substantially 180 electrical degrees apart. Where the polarized element is made a permanent magnet a special material having high retentivity will be used to prevent demagnetization. This element can of course be otherwise polarized and in Fig. 1 it is polarized by a direct current winding energized through a mid-tap and rectifiers 20 and 21 from the alternating current source.

The magnetic part 11 which carries the alternating current exciting winding will preferably be made of soft iron or some other easily magnetized material.

In Fig. 2 the same principle is illustrated in a two-pole motor where the stator 23 carries the alternating current exciting winding 24 and a permanent magnet rotor 25 is used therewith. The commutator arrangement of Fig. 2 consists of a resilient switch member 26 which is caused to alternately make contact at 27 and 28 by an adjustable cam 29 on the rotor shaft. Contacts 27 and 28 are in series with static rectifiers 20 and 21 and the two rectifiers and contact circuits are in parallel in the circuit of exciting winding 24. In Fig. 2 the flux in the stator is a pulsating unidirectional flux which is reversed in direction with the rotation of the rotor during the acceleration period, and becomes a true alternating flux at synchronous speed. To reverse the direction of rotation of the motor in Fig. 2 the cam 29 may be shifted 180 degrees on the rotor shaft.

What I claim as new and desire to secure by Letters Patent of the United States, is:

1. An alternating current motor having stator and rotor members provided with cooperating salient magnetic pole pieces, the pole pieces on one of said members being polarized, an exciting winding for magnetizing the pole pieces of the other member from an alternating current source and commutating and rectifying means included in the exciting winding circuit for causing the polarity of said magnetized pole pieces to reverse at the same rate as that in which the stator and rotor pole pieces pass each other and at such times as to maintain a unidirectional torque relation between the stator and rotor pole pieces during the acceleration of the motor from standstill to synchronous speed.

2. A synchronous motor having stator and rotor elements each provided with cooperating salient magnetic pole pieces, the pole pieces on one element having a constant polarity, an exciting winding on the other element energized from a constant frequency alternating current source and rectifying means including a commutating device operated by the motor inserted in the circuit of said exciting winding to produce in effect a variable frequency alternating current excitation of said exciting winding during the starting period of said motor, the frequency of such excitation varying from zero at standstill to the frequency of the alternating current source at the synchronous speed of the motor in direct proportion to the motor speed, such variable frequency excitation having such phase relation with respect to the relative positions of stator and rotor pole pieces as to produce a unidirectional torque relation between said pole pieces throughout the starting period.

3. An alternating current synchronous motor having cooperating stator and rotor elements each provided with salient pole pieces, means for causing the pole pieces on one of said elements to have a constant polarity, an exciting winding on the other element, a constant frequency alternating current source from which said winding is energized, and means for modifying the character of the excitation received from said alternating current source when the motor is operating below synchronous speed comprising a commutating device operated by said motor and static rectifying means connected in series with the commutating device and exciting winding circuit and serving to supply direct current excitation to said exciting winding and to reverse said excitation as the relative positions of stator and rotor pole pieces are reversed at all speeds below synchronous speed, said means ceasing to have such modifying action on the motor excitation at synchronous speed.

4. An alternating current synchronous motor comprising stator and rotor elements each provided with cooperating salient magnetic poles, alternating current terminals for said motor, an alternating current exciting winding on one of said elements having one end connected to one of said terminals, a commutator device driven by the motor having evenly spaced insulating and conducting segments equal to the pole number of the motor, a pair of brushes displaced 180 electrical degrees bearing on said commutator, a pair of reversely connected static valves in series with the brushes, said commutator brushes and valves being inserted between the other end of said exciting winding and said other alternating current terminal with one brush and valve in parallel with the other brush and valve, and a direct current exciting winding on the other motor element connected to be supplied through said static valves from said alternating current terminals.

5. An alternating current synchronous motor comprising stator and rotor elements each provided with cooperating salient pole pieces, one of said elements comprising a permanent magnet, an exciting winding on the other element, alternating current terminals for said motor, connections including current commutating and current rectifying means between said exciting winding and alternating current terminals, said means being ineffective to modify the character of the excitation supplied from said terminals to the exciting winding at the synchronous speed of the motor, but being effective at all motor speeds below synchronism to supply direct current excitation to said winding and reverse its direction as the stator and rotor pole pieces reverse in relative positions at such times as to produce a unidirectional torque relation between the stator and rotor pole pieces.

6. An alternating current synchronous motor comprising stator and rotor elements each provided with cooperating salient pole pieces, the pole pieces on one member having a constant polarity, an alternating current exciting winding on the other of said members, alternating current terminals for supplying said winding with a constant frequency alternating current at synchronous speed, a circuit through which said current is supplied including reversely connected static valves and a commutating device operated by the motor for alternately shifting the circuit connection from one valve to the other for each 180 electrical degrees of rotation of said motor, and means for adjusting the commutating device to vary the relative angular position of stator and rotor pole pieces at which the shifting of the circuit connections will occur.

7. An alternating current synchronous motor having stator and rotor members each provided with cooperating salient pole pieces, alternating current terminals, a direct current winding on one of said members, a pair of static rectifiers, connections for supplying said direct current winding with direct current from said alternating current terminals through said rectifiers, an alternating current winding on the other of said members, a commutating device operated by said motor, and connections for supplying said last mentioned winding with alternating current at a frequency that varies directly with the speed of the motor from said alternating current terminals through said rectifiers and commutating device.

SHIZUO KARASAWA.